United States Patent
Jones et al.

(10) Patent No.: US 8,823,728 B2
(45) Date of Patent: Sep. 2, 2014

(54) DYNAMICALLY GENERATED IMAGES AND EFFECTS

(71) Applicant: Apple Inc., Cupertino, CA (US)

(72) Inventors: Chad E. Jones, Santa Clara, CA (US); John O. Louch, San Luis Obispo, CA (US); Bas Ording, San Francisco, CA (US); Christopher P Wright, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 13/631,632

(22) Filed: Sep. 28, 2012

(65) Prior Publication Data

US 2013/0328910 A1 Dec. 12, 2013

Related U.S. Application Data

(60) Provisional application No. 61/657,687, filed on Jun. 8, 2012.

(51) Int. Cl.
| | |
|---|---|
| *G06T 15/60* | (2006.01) |
| *G09G 5/00* | (2006.01) |
| *G09G 5/02* | (2006.01) |
| *G06T 11/00* | (2006.01) |
| *H04N 1/46* | (2006.01) |
| *G03F 3/08* | (2006.01) |
| *G06K 9/00* | (2006.01) |
| *G06K 9/40* | (2006.01) |
| *G06K 9/76* | (2006.01) |
| *G06K 9/46* | (2006.01) |
| *G06K 9/36* | (2006.01) |
| *H04N 1/60* | (2006.01) |

(52) U.S. Cl.
CPC .............. *G09G 5/02* (2013.01); *H04N 1/6058* (2013.01)
USPC ........... 345/589; 345/426; 345/592; 345/619; 345/441; 345/629; 358/516; 358/518; 358/520; 382/167; 382/203; 382/213; 382/266; 382/283

(58) Field of Classification Search
USPC ......... 345/418–419, 426, 581, 592, 600, 606, 345/611, 618–620, 625–626, 629–630, 441, 345/469, 469.1, 660, 472; 358/509, 358/516–520, 525; 382/162–163, 167, 199, 382/201, 203, 213–214, 254, 264, 266, 274, 382/276, 283, 298–300
See application file for complete search history.

(56) References Cited

U.S. PATENT DOCUMENTS 6,252,608 B1 * 6/2001 Snyder et al. ................. 345/473
6,348,919 B1   2/2002 Murphy (Continued)

*Primary Examiner* — Wesner Sajous
(74) *Attorney, Agent, or Firm* — Kenyon & Kenyon LLP

(57) ABSTRACT

A shape may be virtually generated from a formula specifying a scalable property of the shape that determines the appearance of the shape as the size of the shape is changed. Once the shape is generated, a reflection and/or shadow may be generated according to one or more customizable parameters specifying different properties of the reflection and/or shadow. Reflections and shadows may be regenerated with shapes each time the shapes are resized. Each generated shape, reflection, and/or shadow may then be outputted to a display. Systems, methods, and computer readable media are provided.

23 Claims, 3 Drawing Sheets

(56) References Cited

U.S. PATENT DOCUMENTS

| | | |
|---|---|---|
| 6,803,923 B1 | 10/2004 | Hamburg |
| 7,701,470 B2 | 4/2010 | Wilensky et al. |
| 7,808,503 B2 | 10/2010 | Duluk, Jr. et al. |
| 2009/0034874 A1* | 2/2009 | Miller .......................... 382/279 |
| 2010/0278424 A1 | 11/2010 | Warner |
| 2012/0127204 A1* | 5/2012 | Distler ......................... 345/647 |
| 2012/0306914 A1* | 12/2012 | Sepulveda et al. ............ 345/629 |

* cited by examiner

DYNAMICALLY GENERATED IMAGES AND EFFECTS

CROSS-REFERENCE TO RELATED APPLICATIONS

This application claims priority under 35 U.S.C. §119 to provisional application No. 61/657,687, filed Jun. 8, 2012, entitled "Dynamically Generated Images and Effects," and the content of which is incorporated herein by reference in its entirety.

BACKGROUND

Computer programs and operating systems have included different customization options that allowed users to change the visual appearance of the programs to the user. For example, some programs have allowed users to change the location of shapes and other objects, such as icons and images, on the screen. As the graphics processing capabilities of computers and the resolution of screens improved, the resolution and detail included in these objects also increased. For example, if one object has been placed in front of another object, a shadow of the front object may have been projected onto the back object. Similarly, if one object has been placed near another object with at least a partially reflective surface, such an object representing a glass pane, a reflection of the object placed near the reflective surface may have been projected on to the reflective surface.

To improve the realistic appearance of these reflections and shadows, various effects were applied to the reflections and shadows. Images of the objects were then saved with the reflections and shadows. If the computer program provided for different selectable object sizes, then separate images, reflections, and shadows, would be generated and saved for each of the different selectable sizes.

While generating and saving copies of images at different sizes was adequate for a relatively small number of different selectable sizes, it is impractical in situations where there are large numbers of different combinations of image sizes and/or orientations that would require a large number of saved image, reflection, and shadow sizes and orientations. For example, saving of copies of images, reflections, and shadows at different sizes would be impractical for an image that is continuously resizable to any user selected size between two values.

There is a need for automatically generating reflections and shadows in real time for scalable objects as the scalable objects are resized. Additionally, because these customization options are often incidental to the main functions of the computer programs, they are commonly executed as background or other processes using minimal computing resources. There is also therefore a need to automatically generate these reflections and shadows using minimal computer resources.

DETAILED DESCRIPTION

A shape may be rendered from a formula specifying a scalable property of the shape that determines the appearance of the shape as the size of the shape is changed. For example, if the shape is a rectangle, a scalable formula may specify a particular height-to-width ratio of the rectangle that may be used to generate different rectangle sizes.

Once the shape having a desired size has been rendered, a reflection and/or shadow may be automatically generated for the shape according to one or more customizable parameters specifying different properties of the reflections or shadows. The reflections and/or shadows may be regenerated with the shape each time the shape is resized. The generated shape and a generated reflection and/or shadow may then be outputted to a display on which they can be seen by a user.

Other formulas and shapes may be used in different instances. For example, a function for generating a scalable trapezoid may include a ratio of a height of the trapezoid to a width of one of the two bases as well as one or more angles between a respective leg and a respective base of the trapezoid. The height to base ratio and the one or more angles may be used to generate a resized trapezoid having a same scale. Different functions for generating different scalable shapes may be used in different embodiments. Additionally, the function may also include other parameters such as a thickness parameter specifying a relative or fixed thickness of an edge of the generated shape. Other parameters may include a rounded corner parameter specifying a roundness of each corner of the generated shape.

Figure 1:
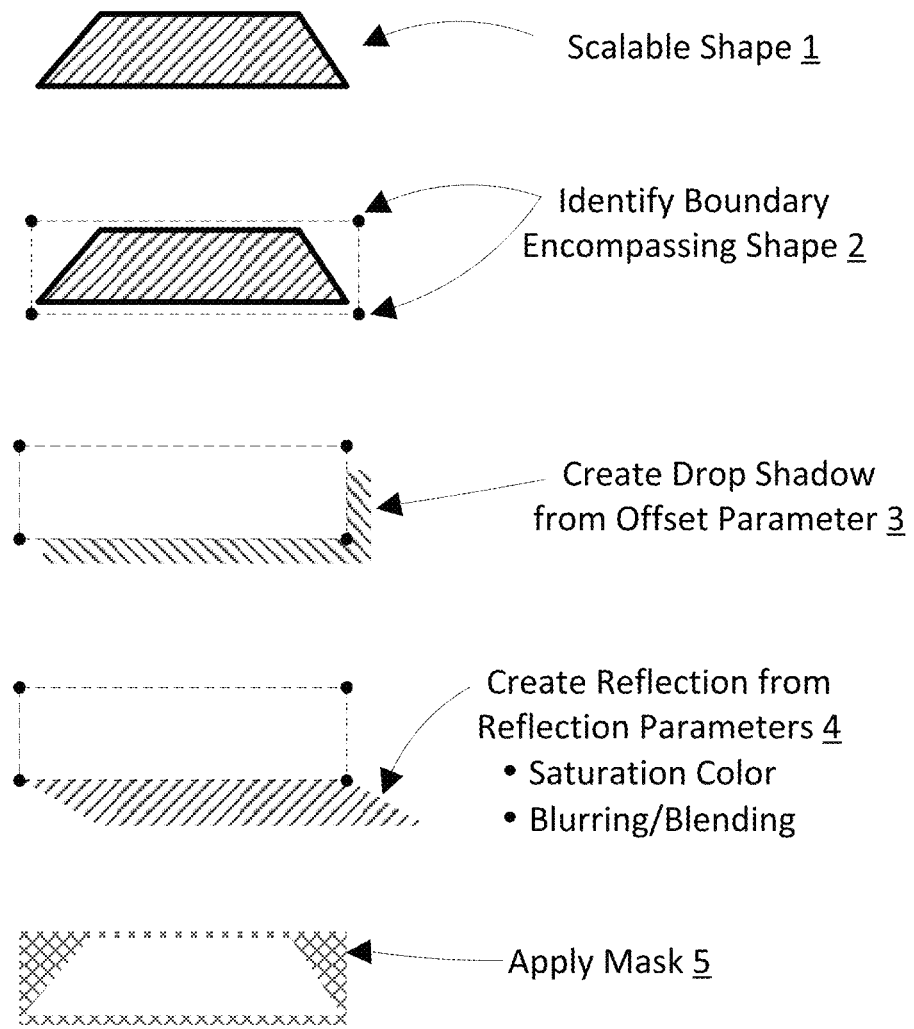
FIG. 1 shows an exemplary shape that may be generated from a scalable shape generating function in an embodiment of the invention.

As discussed previously, once a particular size or scaling of the shape is selected, the shape may be virtually generated. FIG. 1 shows an exemplary scalable trapezoid 1 that may be generated from a trapezoid generating function similar to those discussed above. Once the shape has been generated, a boundary 2 encompassing the shape may be identified. In some instances, the boundary may be a tightest fitting rectangle that encompasses the entire generated shape. In other instances, the boundary may be a rectangle that encompasses the entire generated shape but is not a tightest fitting rectangle. In yet other instances, different boundary shapes, including, but not limited to, trapezoids, circles, and polygons, that encompass the generated shape may be used instead of rectangles.

In other instances a series of points surrounding the generated shape may be identified and a boundary may be identified by connecting the series of points. In the case of FIG. 1, four points 2 surrounding the generated trapezoid 1 were identified and a rectangular boundary was identified by connecting the four points. In other embodiments, a different number of points may be identified and the points may be connected differently to form polygons, circles, ovals, or other shapes.

Once the boundary 2 encompassing the generated shape 1 has been identified, a drop shadow 3 may be virtually generated and aligned with or offset from the identified boundary 2 according a drop shadow offset parameter. A drop shadow may create a visual effect that looks like a shadow of the shape 1 and/or the identified boundary 2 to give a user the impression that the shape 1 is raised above an object appearing behind it on the screen. The drop shadow offset parameter may specify a fixed, variable, or relative amount that the drop shadow 3 may be offset from the identified boundary. For example, the drop shadow parameter may specify that the drop shadow is to be offset by a certain percent (such as 10% in one non-limiting example) from the identified boundary 2.

Once the boundary 2 encompassing the generated shape 1 has been identified, a reflection 4 may be virtually generated and aligned with the identified boundary 2. The reflection 4 may be a mirror image representing a reflected copy of the shape 1 or the identified boundary 2 that appears identical but reversed. Reflection parameters, which may include a color saturation parameter and/or a blurring or blending parameter used to generate the reflection. The color saturation parameter may specify a color gradient that is used to generate a range of position-dependent colors in the reflection. The color saturation parameter may specify a rate at which an intensity or brightness of the reflection is reduced at farther points in the reflection.

The blurring/blending parameter may specify a degree of blurring and/or blending that is to be applied to the reflection. The blending parameter may specify the degree to which the pixels in the reflection are superimposed with those of an object or other background appearing behind the reflection. The blur parameter may specify the degree to which the reflection is defocused and/or the sharpness and contrast of the reflection are reduced.

An image mask 5 may also be specified and applied to the identified boundary 2. The image mask 5 may be used to identify transparent areas within the identified boundary 2 that are not occupied by the generated shape 1. Applying the mask 5 may ensure that only the generated shape 1, drop shadow 3, and/or reflection 4 are displayed over any background objects or wallpaper on the screen while also displaying the surrounding pixels of the background objects or wallpaper in the transparent areas within the identified boundary.

In some instances, a mask 5 may be applied to the generated shape 1, the drop shadow 3, or the reflection 4. This mask application may occur instead of or addition to the mask applied to the identified boundary 2. The application of any masks 5 may occur before or after the drop shadow 3 and/or reflection 4 are generated.

An edge darkening effect may be applied to one or more edges of the generated shape 1. An edge darkening parameter may specify an amount of darkening applied to the one or more edges of the generated shape 1. The edge darkening effect, if applied, may be applied at any time after the virtual generation of the shape 1.

A noise effect may also be applied to the generated shape 1, drop shadow 3, and/or reflection 4. A noise parameter may specify a relative amount of variation of brightness or color applied to the generated shape 1, drop shadow 3, and/or reflection 4. The noise effect, if applied, may be applied at any time after the respective generation of the shape 1, drop shadow 3, and/or reflection 4.

Figure 2:
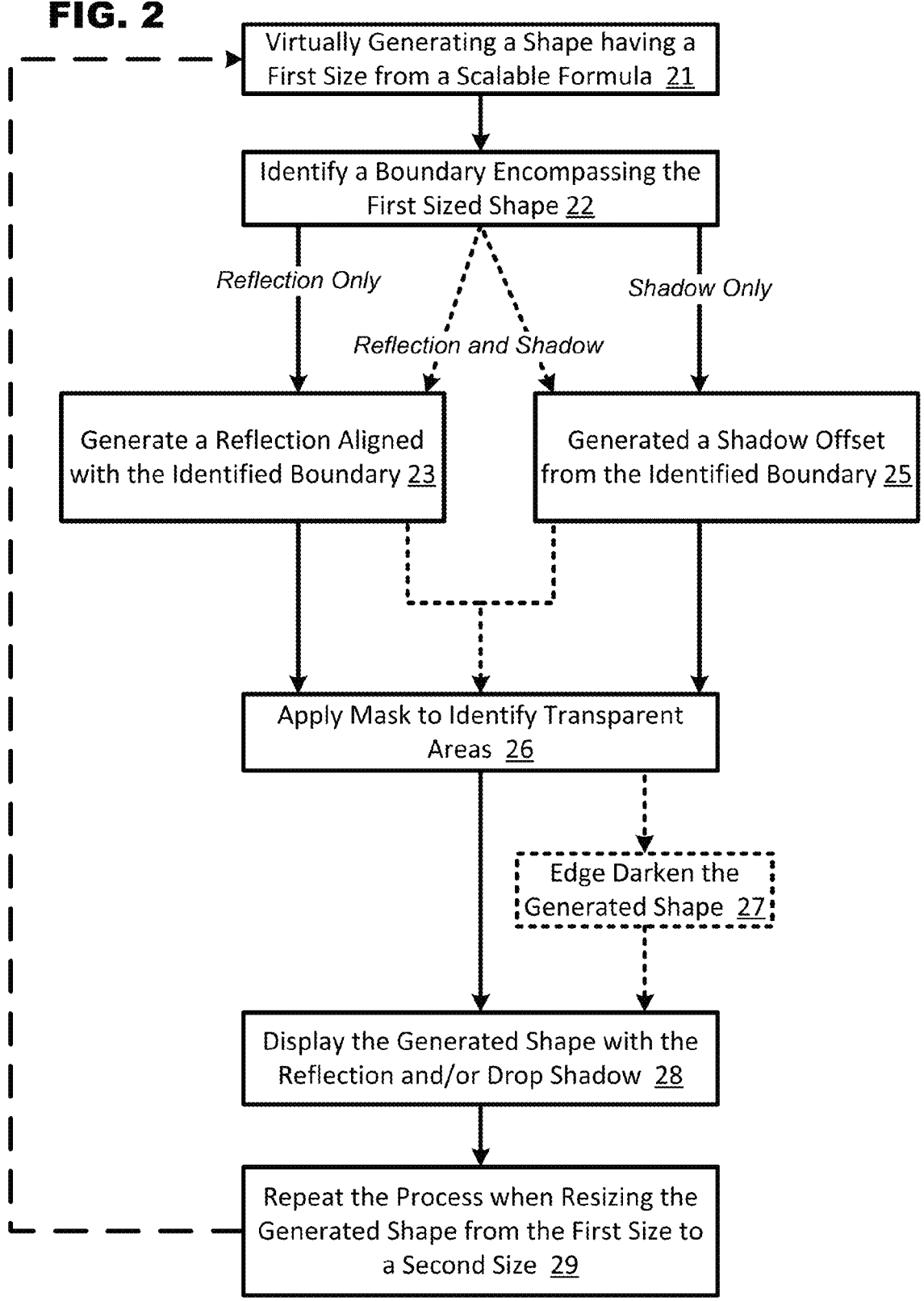
FIG. 2 shows an exemplary process in an embodiment of the invention.

FIG. 2 shows an exemplary process in an embodiment of the invention. In some instances, one or more of these processes may be stored in a set of instructions on a non-transitory computer readable medium, that when executed by a processing device, cause the processing device to perform the process.

In box 21, a shape having a first size may be rendered from a scalable formula used to generate different sized shapes. The scalable formula may include a function specifying a scalable property of the shape that determines the appearance of the shape depending on the selected size. For example, if the shape is a rectangle, the scalable property may include a ratio of the height of the rectangle to the width. If the shape is another polygon, the scalable property may include a relationship between the lengths and/or angles associated with one or more sides of the polygon. Other scalable properties may be used for different shapes.

The shape generation in box 21 may include rendering the entire shape, an outline of the shape, or it may simply identify one or more properties that the shape would have when it is actually displayed on the screen. These properties may include a location of position of a point or edge of the shape or some other aspect of the shape that may be used to identify a boundary encompassing the shape.

In box 22, a boundary encompassing the first sized shape generated in box 21 may be identified. The boundary may be identified by calculating a smallest rectangle encompassing the entire generated shape. In other instances, a larger rectangle or other shapes, including, but not limited to, trapezoids, circles, and polygons, encompassing the entire generated shape may be used instead of rectangles.

The process shown in FIG. 2 may be used to generate and display not only the shape itself, but also one or more image effects, such as a shadow or reflection that may be projected from the shape onto other objects on the screen. If the process is used to generate and display the shape and a reflection of the shape on another reflective object surface, then the process may go to box 23. If the process is used to generate and display the shape and a shadow of the shape on another object positioned at least partially behind the shape, then the process may go to box 25. If the process is used to generate and display the shape and both a reflection of shape on a reflective object surface and a shadow of the shape on another object positioned at least partially behind the shape, then the process may go to both boxes 23 and 25.

In box 23, a reflection of either the shape or the boundary encompassing the shape may be rendered and aligned with the boundary identified in box 22. The reflection may be generated from one or more reflection parameters that may specify a rate at which an intensity or brightness of the reflection is reduced at farther points in the reflection away from the boundary, the degree to which the pixels in the reflection may be superimposed with those of an object or other background co-located with the reflection so as to appear as though it is behind the object, and/or the degree to which the reflection is defocused through a reduction of at least one of the sharpness and contrast of the reflection. Other parameters may be specified in different embodiments.

In box 25, a shadow effect, such as a drop shadow, may be virtually generated and offset from the identified boundary. An offset parameter may be used to specify the degree to which the shadow is offset from the identified boundary. The offset parameter may specify a fixed, variable, or relative degree of the offset, such as, in one non-limiting example, a percentage by which the shadow is offset from the boundary.

In box 26, a mask may be applied to at least one of the identified boundary, the reflection, and the shadow. The mask may identify transparent areas in the identified boundary that are not occupied by the generated shape. In some instance, the mask may also identify areas in the generated reflection or the generated shadow that would not be occupied by a reflection or shadow of the generated shape. The application of one or more masks may occur before or after the shadow in box 25 and/or the reflection in box 23 are generated.

In some instances, an edge darkening effect in box 27 may be applied to generated shape, reflection, shadow, and/or edge of a mask. An edge darkening parameter may specify an amount of darkening to be applied to one or more edges of the generated shape, reflection, shadow, and/or masks. The edge darkening effect, if applied, may be applied at any time after the generation of the shape in box 21, and need not be performed after applying a mask in box 26.

In box 28, the rendered shape and any generated reflection and/or shadow may then be displayed on the screen to the user. While the shape and any generated reflection and/or shadow is displayed, the shape may be resized at the direction of a user or computer process. The above process may be applied in those instances where the shape is being initially rendered and/or is being resized.

In box 29, process may repeat and return to box 21 to regenerate the shape and a reflection and/or shadow using the new resized shape.

Figure 3:
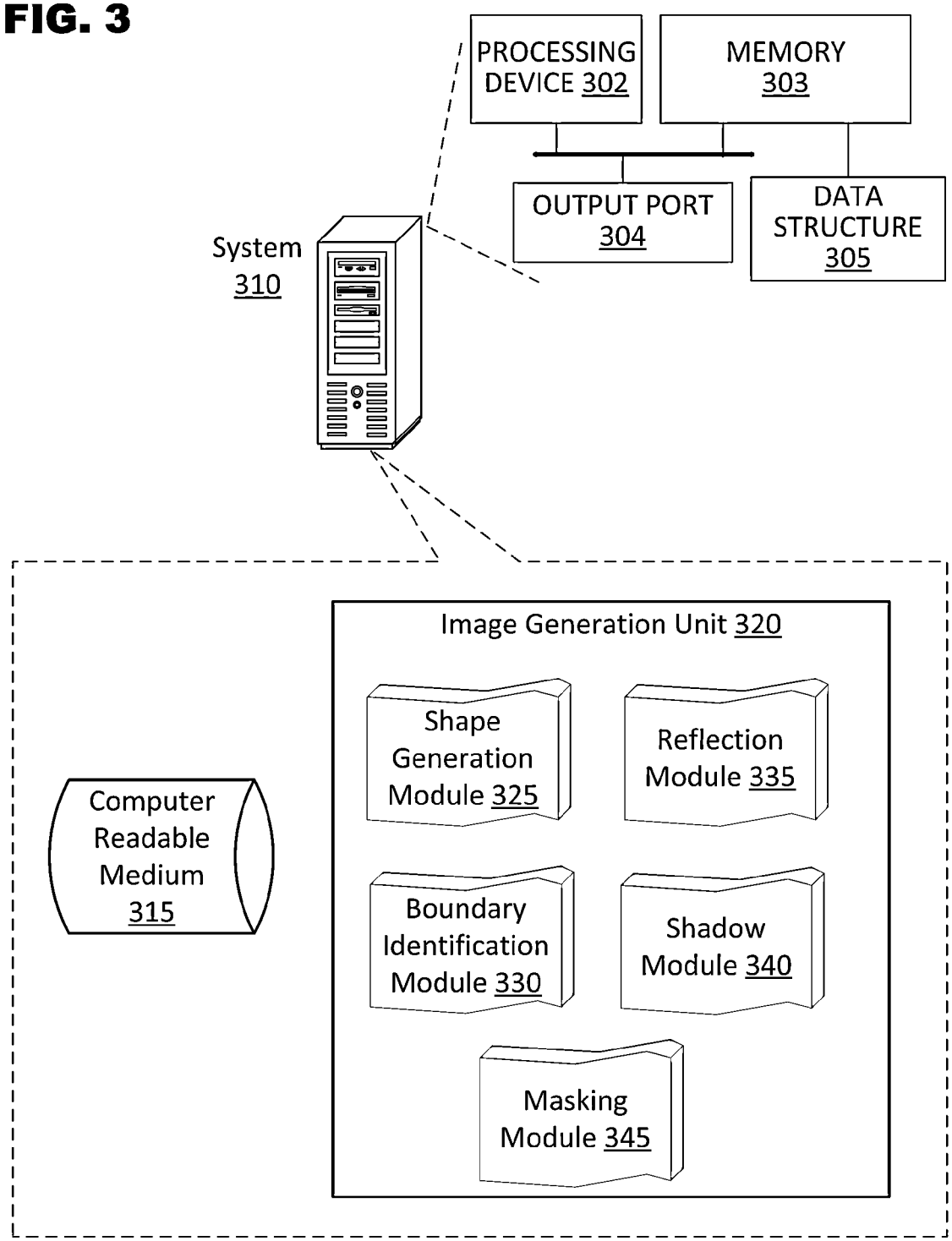
FIG. 3 shows an exemplary architecture in an embodiment of the invention.

FIG. 3 shows an exemplary architecture in an embodiment of the invention. A system 310 may include a computer readable medium 315 storing image data and an image generation unit 320 containing modules 325 to 345 for generating an image from image parameters. The computer readable medium 315 may contain a hard disk drive, flash memory, or other storage device capable of storing data. The modules 325 to 345 in the image generation unit 320 may include a shape generation module 325, a boundary identification module 330, a reflection module 335, a shadow module 340, and/or a masking module 345.

In some instances, one or more of these modules 325 to 345 may include a set of instructions for instructing a processing device 302 and/or the image generation unit 320 how to generate a shape and a reflection and/or shadow of the shape by performing the functionality associated with the respective modules 325 to 345. These instructions may be stored in the computer readable medium 315, a memory 303, or data structure 305. The image generation unit 320 may also include instructions for regenerating a shape and a reflection and/or shadow in response to an instruction or request to resize a previously generated shape.

The processing device 302 and/or image generation unit 320 may execute the image generation instructions associated with each of the modules 325 to 345. The processing device 302 may also receive and/or process an instruction to generate an effect, such as a reflection and/or shadow, of an image object.

The shape generation module 325 may include functionality for rendering shapes including resized shapes. The size and appearance of the shape may be determined in some instances from a scalable formula.

The boundary identification module 330 may include functionality for identifying a boundary encompassing the shape.

The reflection module 335 may include functionality for generating a reflection from a mirror image of the generated shape, aligning the reflection with the boundary, applying a color gradient to the reflection according to a color saturation parameter specifying a rate of change of an intensity or brightness of the mirror image, and applying a blending effect to the reflection according to a blending parameter specifying a degree to which pixels in the reflection are superimposed with those of an object appearing as located behind the reflection.

The shadow module 340 may include functionality for generating a generating a shadow from a darkened copy of the shape and offsetting the shadow from the boundary according to an offset specified in an offset parameter.

The masking module 345 for applying a mask identifying transparent areas within the boundary that are not occupied by the shape.

The system 310 may also include an output port 304. The output port 304 may include an interface through which the generated shape, the generated reflection, and/or the generated shadow may be outputted to a display device for display on a screen.

System 310 may contain a processing device 302, memory 303 storing loaded data or a loaded data structure 305, and an output port 304, all of which may be interconnected via a system bus. System 310 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Output port 304 may enable connectivity between the system 310 and an external high resolution display screen so that image data can be displayed on the display screen. Memory 303 may contain different components for retrieving, presenting, changing, and saving data and may include the computer readable medium 315. Memory 303 may include a variety of memory devices, for example, Dynamic Random Access Memory (DRAM), Static RAM (SRAM), flash memory, cache memory, and other memory devices. Additionally, for example, memory 303 and processing device(s) 302 may be distributed across several different computers that collectively comprise a system.

Processing device 302 may perform computation and control functions of a system and comprises a suitable central processing unit (CPU). Processing device 302 may include a single integrated circuit, such as a microprocessing device, or may include any suitable number of integrated circuit devices and/or circuit boards working in cooperation to accomplish the functions of a processing device. Processing device 302 may execute computer programs, such as object-oriented computer programs, within memory 303.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the image generation unit 320 is shown as a separate component from the processing device 302, in some instances the image generation unit 320 may include or otherwise use the processing device 302 to generate image data.

We claim:

1. A computer-implemented method comprising, when a rendered shape is resized:
   identifying, using a processing device, a boundary encompassing the rendered shape;
   generating a reflection from a mirror image of the shape;
   aligning the reflection with the boundary;
   applying a color gradient to the reflection according to a color saturation parameter specifying a rate of change of a brightness of the mirror image;
   applying a blending effect to the reflection according to a blending parameter specifying a degree to which pixels in the reflection are superimposed with those of an object appearing co-located with the reflection;
   applying a mask identifying transparent areas within the boundary that are not occupied by the shape; and
   displaying the shape and the reflection after completing the above steps.

2. The computer-implemented method of claim 1, further comprising:
   identifying a plurality of points surrounding the shape; and
   connecting the identified points to identify the boundary.

3. The computer-implemented method of claim 2, further comprising:
   identifying at least four points surrounding the shape; and
   connecting the at least four point identified points in a trapezoid to identify the boundary.

4. The computer-implemented method of claim 2, further comprising:
   identifying at least four points surrounding the shape; and
   connecting the at least four point identified points in a rectangle to identify the boundary.

5. The computer-implemented method of claim 1, further comprising:

generating a shadow from a darkened copy of the shape;
offsetting the shadow from the boundary according to an offset specified in an offset parameter;
applying a mask identifying transparent areas within the boundary that are not occupied by the shape; and
displaying the shape and the shadow after completing the above steps.

6. The computer-implemented method of claim 5, wherein the mask is applied to the shape, the shadow, and the reflection.

7. The computer-implemented method of claim 1, further comprising applying a blur effect to the reflection according to a blur parameter.

8. The computer-implemented method of claim 7, wherein the blur parameter specifies a degree to which at least one of a sharpness and a contrast of the reflection is reduced.

9. The computer-implemented method of claim 7, wherein the blur parameter specifies a degree to which the reflection is defocused.

10. The computer-implemented method of claim 1, wherein the mask is applied to the shape and the reflection.

11. The computer-implemented method of claim 1, wherein the mask is applied only to the shape.

12. The computer-implemented method of claim 1, further comprising applying an edge darkening effect to an edge of the shape according to an edge darkening parameter specifying an amount of darkening applied to the edge of the shape.

13. The computer-implemented method of claim 1, further comprising applying a noise effect to the shape according to a noise parameter specifying an amount of variation of a brightness or color applied to the shape.

14. The computer-implemented method of claim 13, further comprising applying the noise effect to the reflection.

15. The computer-implemented method of claim 1, wherein the shape is rendered from a scalable formula for generating shapes of different sizes.

16. A computer-implemented method comprising, when a rendered shape is resized:
identifying, using a processing device, a boundary encompassing the rendered shape;
generating a shadow from a darkened copy of the shape;
offsetting the shadow from the boundary according to an offset specified in an offset parameter;
applying a mask identifying transparent areas within the boundary that are not occupied by the shape; and
displaying the shape and the shadow after completing the above steps.

17. The computer-implemented method of claim 16, wherein the offset parameter specifies a percentage by which the shadow is offset from the shape.

18. The computer-implemented method of claim 16, further comprising applying a noise effect to the shape and the shadow according to a noise parameter specifying an amount of variation of a brightness or color applied to the shape.

19. The computer-implemented method of claim 16, wherein the mask is applied to the shape and the shadow.

20. The computer-implemented method of claim 16, wherein the mask is applied only to the shape.

21. A system comprising:
a processing device for receiving an instruction to generate a resized shape;
an image generation unit including:
    a shape generation module for rendering the resized shape;
    a boundary identification module for identifying a boundary encompassing the shape;
    a reflection module for generating a reflection from a mirror image of the shape, aligning the reflection with the boundary, applying a color gradient to the reflection according to a color saturation parameter specifying a rate of change of a brightness of the mirror image, and applying a blending effect to the reflection according to a blending parameter specifying a degree to which pixels in the reflection are superimposed with those of an object appearing as co-located with the reflection;
    a masking module for applying a mask identifying transparent areas within the boundary that are not occupied by the shape; and
a port for outputting the shape and the reflection to a display device.

22. The system of claim 21, wherein the image generation unit further includes a shadow module for generating a shadow from a darkened copy of the shape and offsetting the shadow from the boundary according to an offset specified in an offset parameter, and the port outputs the shape, the reflection, and the shadow to the display device.

23. A system comprising:
a processing device for receiving an instruction to generate a resized shape;
an image generation unit including:
    a shape generation module for rendering the resized shape;
    a boundary identification module for identifying a boundary encompassing the shape;
    a shadow module for generating a shadow from a darkened copy of the shape and offsetting the shadow from the boundary according to an offset specified in an offset parameter;
    a masking module for applying a mask identifying transparent areas within the boundary that are not occupied by the shape; and
a port for outputting the shape and the reflection to a display device.

* * * * *